United States Patent
Camp, Jr. et al.

[11] Patent Number: 5,867,131
[45] Date of Patent: Feb. 2, 1999

[54] ANTENNA FOR A MOBILE COMPUTER

[75] Inventors: William O. Camp, Jr., Chapel Hill; Daniel Paul Homiller, Hickory, both of N.C.

[73] Assignee: International Business Machines Corporation, Armonk, N.Y.

[21] Appl. No.: 752,405

[22] Filed: Nov. 19, 1996

[51] Int. Cl.$^6$ .................................................. H01Q 21/26
[52] U.S. Cl. .......................... 343/797; 343/702; 343/729; 343/795
[58] Field of Search ..................... 343/729, 725, 343/700 MS, 702, 793, 795, 797, 799, 830, 893, 853, 872, 810, 807, 808, 809

[56] References Cited

U.S. PATENT DOCUMENTS

| | | | |
|---|---|---|---|
| 4,121,218 | 10/1978 | Irwin et al. | 343/702 |
| 4,313,119 | 1/1982 | Garay et al. | 343/702 |
| 4,356,492 | 10/1982 | Kaloi | 343/700 MS |
| 4,584,709 | 4/1986 | Kneisel et al. | 455/78 |
| 4,922,263 | 5/1990 | Dubost et al. | 343/797 |
| 5,075,691 | 12/1991 | Garay et al. | 343/830 |
| 5,138,328 | 8/1992 | Zibrik et al. | 343/702 |
| 5,229,777 | 7/1993 | Doyle | 343/700 MS |
| 5,361,061 | 11/1994 | Mays et al. | 340/825.44 |
| 5,373,300 | 12/1994 | Jenness et al. | 343/102 |
| 5,387,919 | 2/1995 | Lam et al. | 343/821 |

OTHER PUBLICATIONS

IBM, TDB, vol. 37, No. 8, Aug. 1994, pp. 89–90.

*Primary Examiner*—Don Wong
*Assistant Examiner*—Tho Phan
*Attorney, Agent, or Firm*—John D. Flynn

[57] ABSTRACT

Disclosed is an antenna mounted on a dielectric card with three pairs of dipoles. The dielectric card may be made of epoxy or epoxy glass or Teflon with glass fibers or any plastic with low dielectric loss and/or glass. Each dipole pair is designed to resonate at a different frequency band. Thus, for instance, a first pair provide signals in 800 MHZ range, a second dipole pair provide signals in the 1900 MHZ range and a third dipole pair provide signals in the 2400 MHZ range. With multiple dipoles the antenna can be used to provide wireless communications for several different frequency bands. The antenna card may hingeable or slideably mounted to a mobile computer. Thus, using a single antenna card a mobile computer can operate in several different frequency bands.

25 Claims, 10 Drawing Sheets

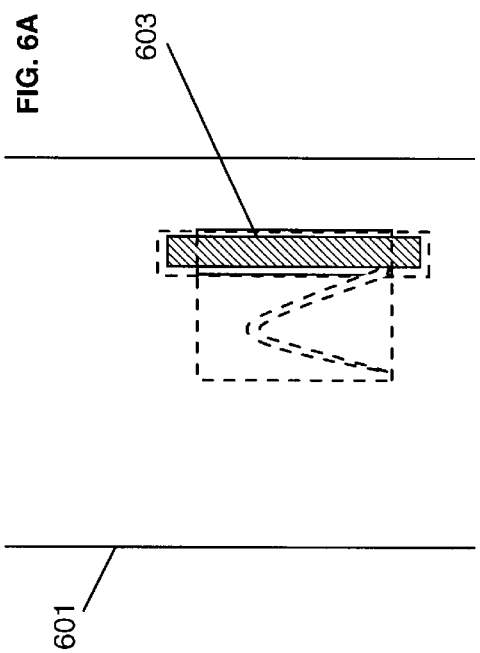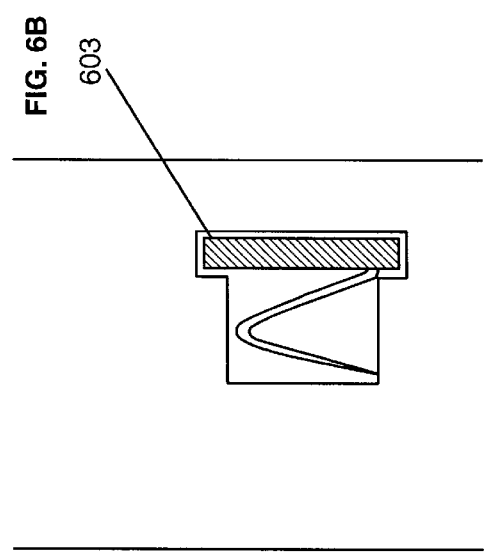

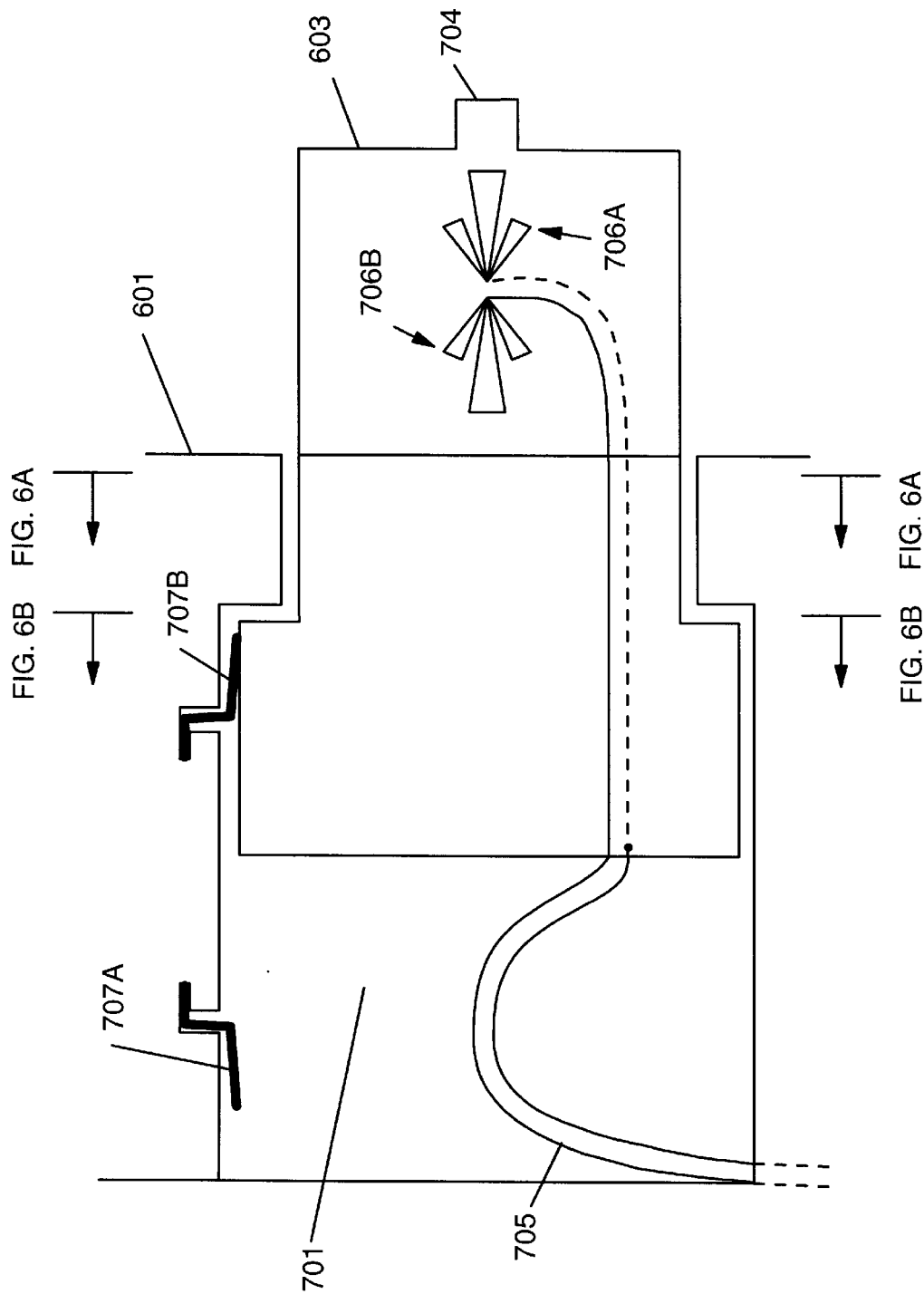

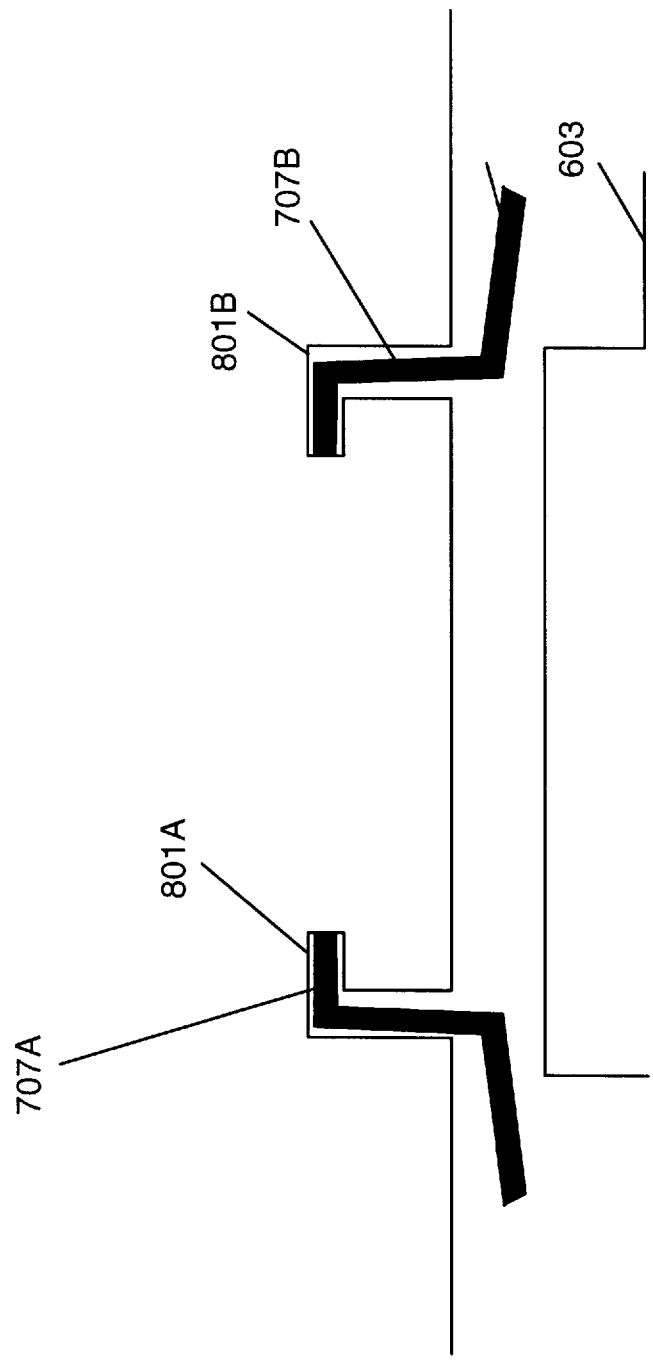

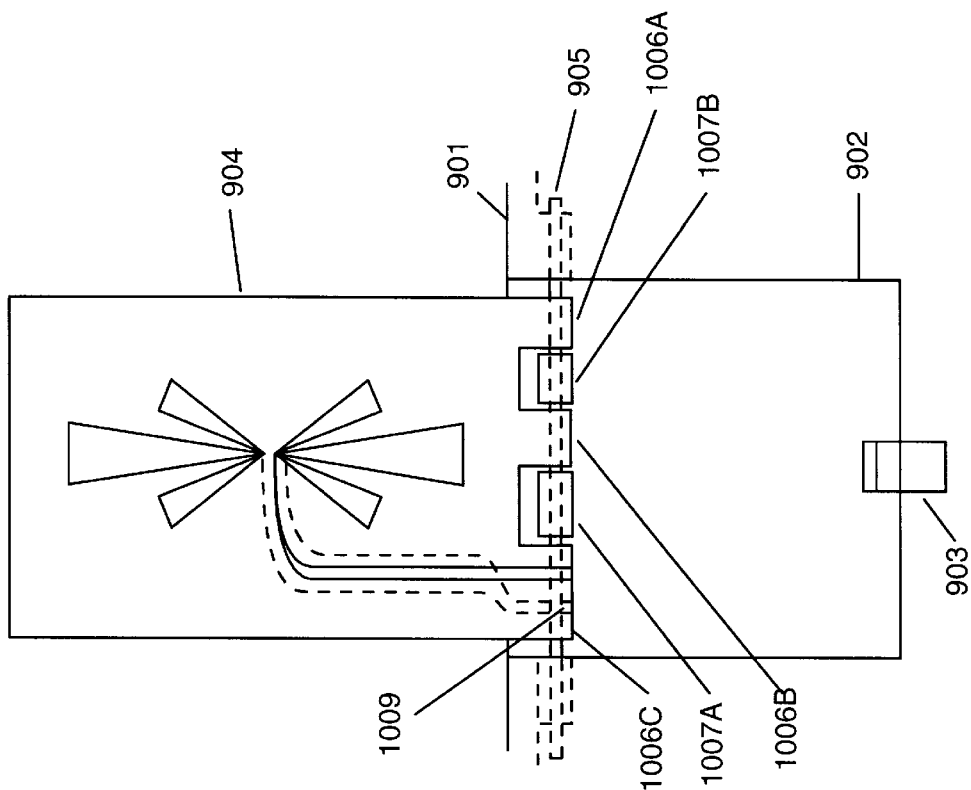
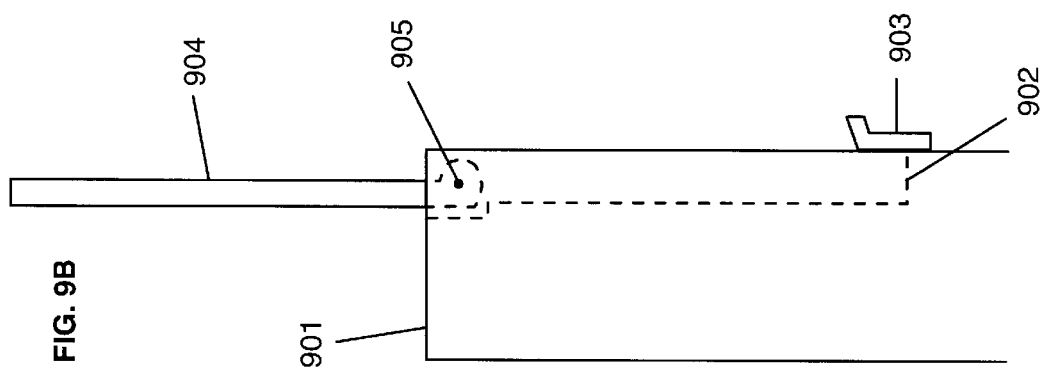
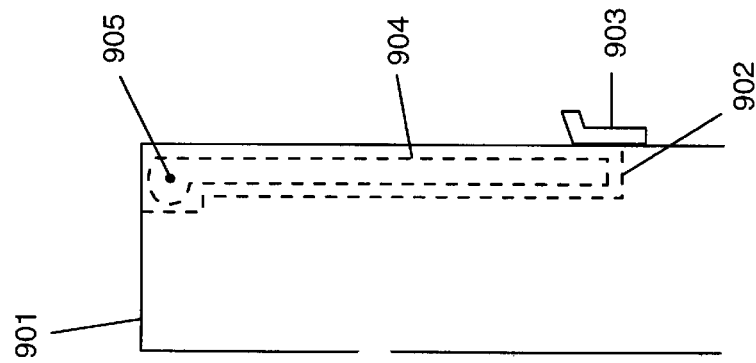

ANTENNA FOR A MOBILE COMPUTER

BACKGROUND OF THE INVENTION

1. Field of the Invention

The present invention is related to antenna for radio communications devices and more particularly, to a radio antenna for mobile computers.

2. Description of the Prior Art

Distributed data processing systems are increasingly common in the modern electronic work place. Such distributed data processing systems may include thousands of computers or workstations including main frame computers, so-called "personal" computers, and modern state-of-the-art portable or "laptop" or "notebook" or "palmtop" computers. In modern distributed data processing systems many such computers may be linked together utilizing various topologies and different types of networks including Advanced-Peer-To-Peer-Networks (APPN), Local Area Networks (LAN), Cellular, PCS, Internet, TCP/IP or various other types of networks. While in the past computer networks are generally coupled together utilizing existing telephone land line systems, or specialized wiring, modern distributed data processing systems often utilize more sophisticated means of communication.

For example, the increasing efficiency and decreasing cost of cellular communication equipment has resulted in the utilization of that technology to couple together multiple computers without the necessity of access to a telephone line outlet. This particular technology is particularly effective in combination with small, portable battery powered laptop or notebook or palmtop computer in which the necessary modern and cellular communication circuitry are miniaturized and provided in an integral fashion with the computer itself. An RF wireless communications device provides access such that the data processing terminal may be coupled to a large network utilizing RF communications technology. Thus, an operator utilizing such a computer may initiate communications and transfer data between his or her computer and a distributed data processing system without the necessity of access to either telephone lines or power lines.

The increasing utilization of such devices and the after market refitting of existing laptop or notebook or palm top type computers with such communications modules result in a problem in the efficiency of the radio frequency communication. That is, devices which are initially designed for utilization with cellular communication circuitry are constructed with internal antenna elements which are optimized for cellular communications; however, the after market refitting of a laptop or notebook or palmtop computer with a combination modem and cellular communication device often causes a problem, since such devices were not designed initially for cellular communication network linking.

The antenna devices typically utilized for cellular communication are generally composed of antenna elements, each including a radiating element which is equal in length to some fraction of the wavelength. Further, in order to enhance the efficiency of communication, these antenna elements must include elements which are separated by a minimum distance and preferably must be oriented normal to each other in space, in order to provide the necessary separation and spatial diversity. Due to the noise from the internal clock cycles and LCD display, the radiating antenna elements are usually positioned externally from the mobile computer.

The problem with a mobile computer having an external antenna is that they are awkward to pack and move. Also these antennas are easily damaged because they protrude from the mobile computer and can easily catch on persons, doorways, doors and other objects.

Also today there are many wireless communications services available to the mobile computer user. These wireless communications providers operate in different frequency bands. The mobile computer user needs to be able to have access to potentially any of the wireless services. Multiple antennas, with different electrical characteristics are typically required. This further burdens the mobile user. Thus, there is a need for an antenna to provide service in multiple frequency bands.

These unresolved problems and deficiencies are clearly felt in the art and are solved by the invention in the manner described below.

SUMMARY OF THE INVENTION

The above-mentioned needs have been met in accordance with the present invention by providing a mobile computer with an external antenna that provides for RF communications in multiple frequency bands and which is storable when not in use.

It is therefore one object of the present invention to provide an improved mobile computer.

It is another object of the present invention to provide an improved external radio frequency antenna for utilization with a mobile computer.

It is another object of the present invention to provide a radio frequency antenna for utilization with a mobile computer that operates in a plurality of RF bands.

It is yet another object of the present invention to provide a slidable antenna that operates in a number of RF bands that can be hidden when RF communication for a mobile computer is not required.

It is yet another object of the present invention to provide a foldable antenna that operates in a number of RF bands that can be hidden when RF communication for a mobile computer are not required.

It is still a further object of the present invention to provide a radio frequency antenna that a mobile computer user can operate safely, quickly and conveniently and is easy to locate when the RF communications are required.

It is still another further object of the present invention to provide a RF antenna that is easily deployed when needed but will stowaway with minimum impact on the mobile computer when not needed.

It is still another further object of the present invention to provide a radio ready mobile computer.

It is still another further object of the present invention to provide a RF antenna for use with a mobile computer that is located at a height that facilitates RF communications.

These and other objects, features and advantages are accomplished by the present invention. The present invention is an antenna on a dielectric card with three pairs of dipoles. The dielectric card may be made of epoxy or epoxy glass or Teflon with glass fibers or any plastic with low dielectric loss and/or glass. Each dipole pair is designed to resonate at a different frequency band. Thus, for instance, a first pair provide signals in 800 MHZ range, a second dipole pair provide signals in the 1900 MHZ range and a third dipole pair provide signals in the 2400 MHZ range. With multiple dipoles the antenna can be used to provide wireless communications for several different frequency bands.

The antenna card may be hingeable or slideably mounted to a mobile computer. Thus, using a single antenna card a mobile computer can operate in several different frequency bands. The mobile computer may be equipped with a sliding mechanism for securing said antenna within a recess in a stowed away position and for securing the antenna in a fully deployed position, said sliding mechanism permitting said antenna card to slide between said fully deployed and stored positions. The mobile computer may be optionally equipped with a hinging mechanism for securing said antenna within a recess in a stowed away position and for securing the antenna in a fully deployed position, said hinging mechanism permitting said antenna card to travel between said fully deployed and stored positions.

BRIEF DESCRIPTION OF THE DRAWINGS

The foregoing and other objects, aspects and advantages of the invention will be better understood from the following detailed description with reference to the drawings, in which:

FIG. 6A depicts a top view of a sliding mechanism within a mobile computer.

FIG. 6B depicts a cutaway view of a sliding mechanism within a mobile computer.

FIG. 7A depicts a side view of a sliding mechanism with antenna card in the deployed position within a mobile computer.

FIG. 8 depicts a flexible spring for use with the sliding antenna.

FIG. 9A depicts the hinging antenna with the antenna in the stowaway position.

FIG. 9B depicts the hinging antenna with the antenna in the deployed position.

FIG. 10 depicts the front view of the hinged antenna in the deployed position.

DETAILED DESCRIPTION

Figure 1:
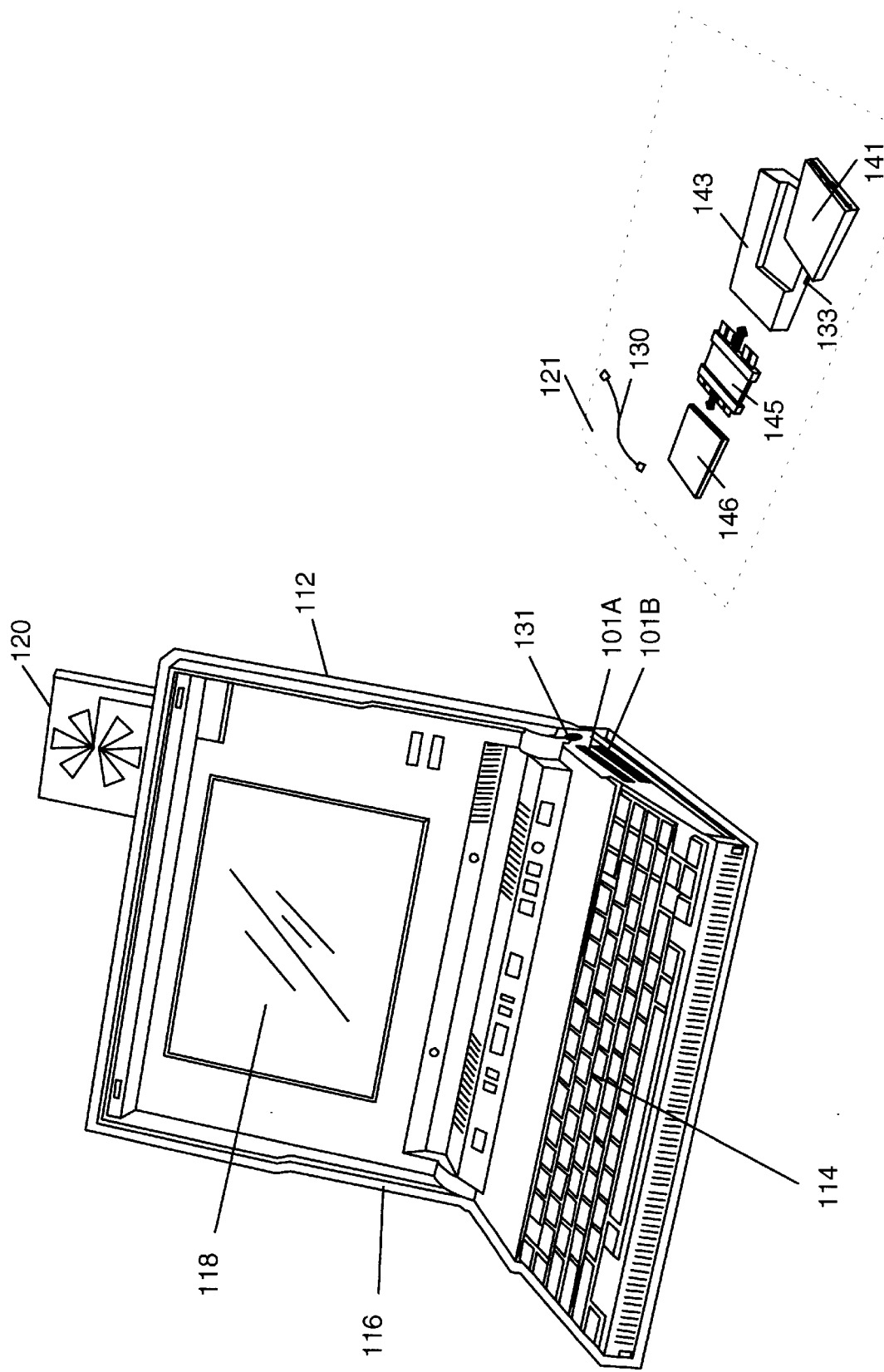
FIG. 1 a mobile computer with external antenna in the deployed position.

With reference now to the figures and in particular with reference to FIG. 1, there is depicted a pictorial representation of a mobile computer 112 which utilizes an external antenna 120 in accordance with the present invention. Mobile Computer 112 is, in the present example, a general purpose computer (such as an IBM® ThinkPad® laptop computer). For the purposes of this specification, "Mobile Computer" is a generic term used to describe a machine, which is usually a computer or terminal or laptop or palmtop or hand held or personal digital assistant or other computer.

In the preferred embodiment the mobile computer provides slots for accepting Adapter Cards that meet applicable Personal Computer Memory Card International Association (PCMCIA) standards. These PCMCIA slots are shown as 101A and 101B in FIG. 1. Note that although the present invention is described with respect to PCMCIA standards it may be used with other PC cards or adapter cards. For the purposes of this specification, "Wireless Adapter" is a generic term used to describe a device which provides an interface for the mobile computer into a wireless communications network, such as a wireless modem or wireless LAN adapter. A wireless modem adapter provides for the RF signal processing. The wireless modem adapter may also provide for baseband processing and may include a battery or other device to provide additional power.

FIG. 1 also depicts a wireless modem adapter 121. As shown, the wireless modem adapter contains: a PCMCIA baseband card 146, a radio card 141, a baseband to radio connector 145, an antenna cabling 130 and a housing 143 containing external batteries. The baseband card 146 may be inserted into one of the PCMCIA slots in the mobile computer 101A or 101B. The coaxial antenna cable 130 electrically couples the radio portion to the antenna 120. The radio card 141 has a connector 133 and the mobile computer provides a connector 131 which attaches to the antenna 120. The coaxial cable between antenna 120 and the connector 131 is not shown. The connector 131 may be located on the system unit portion, for instance as shown, or the display portion (e.g., the side of the display nearest the PCMCIA slots or the bottom of the display portion near the PCMCIA slots). If located on the system unit portion then some of the cabling between the antenna 120 and the connector 131 may be exposed or would require threading or routing through the display portion to the system unit portion out to the connector 131. Alternatively the connector could be located on the antenna card with the cable 130 directly connecting the antenna and radio card 141.

Mobile computer 112 preferably includes a low power display system 116 which preferably provides a display screen 118 which may be implemented utilizing a liquid crystal display (LCD), a gas plasma display or any other suitable technology. A touch screen (not shown) may be used to supplement or in lieu of keyboard 114 or some other input device may be provided with the mobile computer 112 that enables the computer user to operate the computer and access and modify data stored within mobile computer 112 in a manner well known in the art. Note that as shown the antenna is at a relatively high point when deployed and when the mobile computer is in use by an operator (i.e., the display portion is up). This facilitates RF communications.

Figure 2:
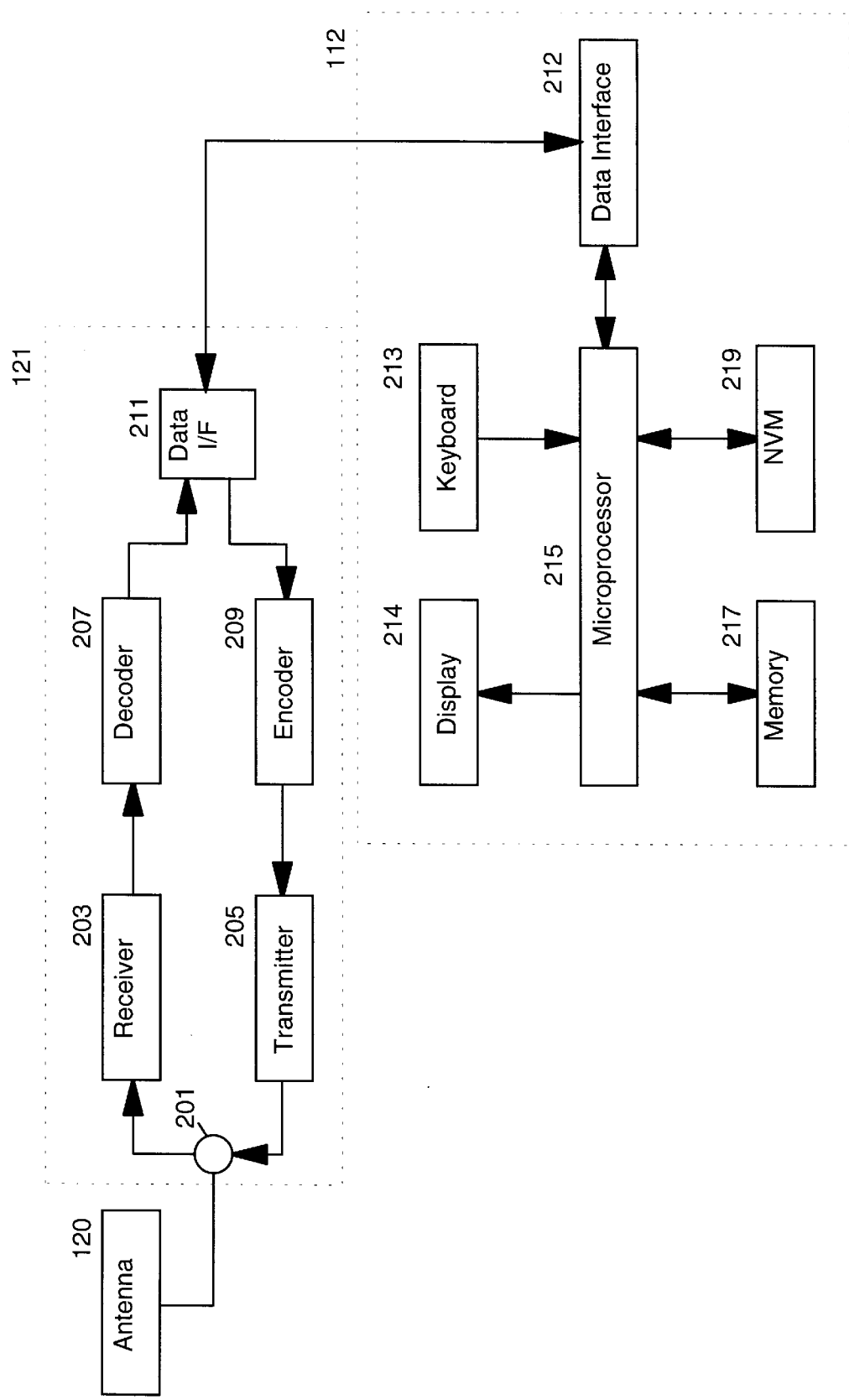
FIG. 2 is a function block diagram of a mobile computer with wireless modem.

Although a portable or mobile computer is used in the preferred embodiment, the present invention can work with any computer. As shown in FIG. 2, a computer 112 comprising a main processor 215, a memory 217, non-volatile memory 219, a display 214, and a keyboard 213 for inputting data. A function block diagram of a wireless modem adapter 121 is depicted with duplexer 201 which provides for sharing the antenna 120 between the receiver 203 and transmitter 205. Also shown is encoder 209 and decoder 207 which are typically implemented using a DSP along with data interface 211. Data interface 211 receives commands and data from the computer 112, as well as provides received data and status information to the computer 112. The data interface 212 performs the inverse function for the computer 112. In the preferred embodiment a PCMCIA compliant interface is utilized. Note that in the computer 112 the keyboard may be replaced by or supplemented with input devices including a touch display, mouse or keypad or voice sensors or image sensors or other pointing devices. Other pointing devices include tablets, numeric keypads, touch screen, touch screen overlays, track balls, joy sticks, light pens, thumb wheels, buttons etc. The main processor can also be connected to communications lines, disk storage, input devices, output devices or other I/O equipment. Any number of other components may be attached to (or reside in) the mobile computer such as printers, facsimile machines, etc., and all are interconnected within (or to) the mobile computer via a bus structure, as is well known in the art.

Figure 3:
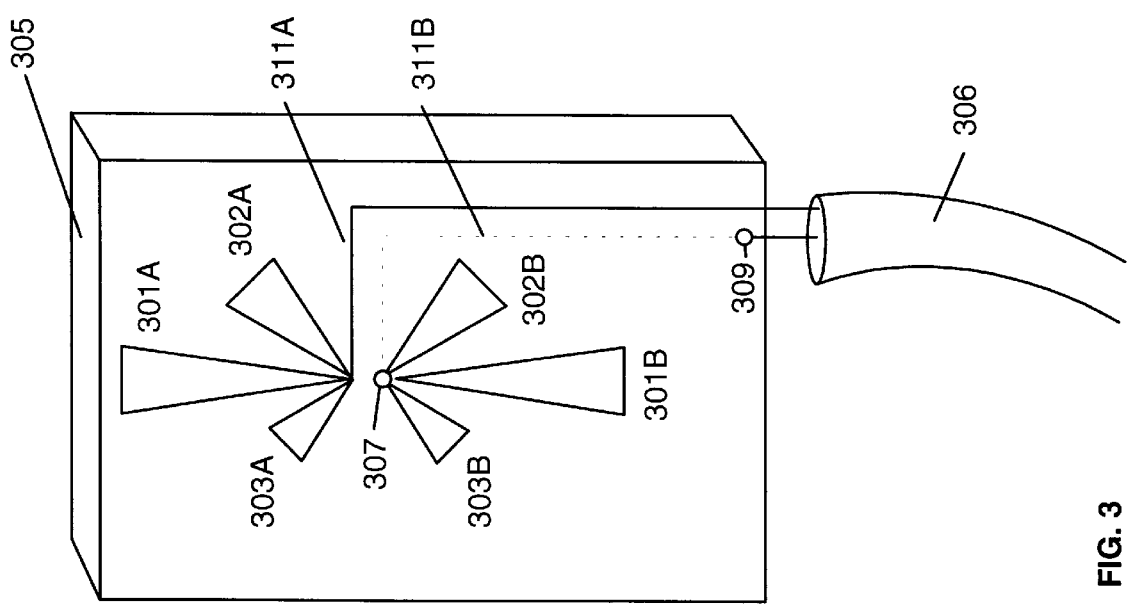
FIG. 3 depicts a view of the external antenna.

FIG. 3 depicts a more detailed look at the antenna 120 of the preferred embodiment of the present invention. As shown the antenna is mounted on a dielectric card 305 with three pairs of dipoles shown as 301, 302 and 303. The dielectric card maybe made of epoxy or epoxy glass or Teflon with glass fibers or any plastic with low dielectric loss and/or glass. Each dipole pair is designed to resonate at a different frequency band. Thus, for instance, dipole pair 301A and 301B provide signals in 800 MHZ range, dipole pair 302A and 302B provide signals in the 1900 MHZ range and dipole pair 303A and 303B provide signals in the 2400 MHZ range. With multiple dipoles the antenna can be used to provide wireless communications for several different frequency bands. Using a single antenna card a mobile computer can operate in several different frequency bands. Among the frequency bands that can be supported are cellular 824–896 MHZ, ARDIS 805–869 MHZ, ISM 902–928 MHZ, GSM 890–960 MHZ, Iridium 1.61–1.63 Ghz, PCS 1.85–1.99 Ghz, ISM 2.40–2.50 Ghz. The dimensions of the dipole elements on the antenna card are changed to provide different frequency responses as desired. As an example, a multi-band antenna for the cellular, PCS and 2.4 Ghz ISM band has lengths (from center to end) of 2.65, 1.25 and 1.0 inches when fabricated on ordinary PC Board, 0.625 inches thick.

Returning to FIG. 3, each of the dipole elements 301A, 302A and 303A are electrically connected at a common point to trace line 311A. Each of the dipole elements 301B, 302B, and 303B are electrically connected to trace line 311B, which is shown as a dotted line because it is located on the opposite side of the epoxy card 305. Via 307 electrically connects the dipole elements 301B, 302B, and 303B to trace line 311B. Note that in an alternative embodiment the dipole elements 301B and 302B, and 303B can be located on the opposite face of the epoxy card 305 along with trace 311B which eliminates the need for via 307. The trace lines 311A and 311B form a 50Ω (ohm) transmission line which terminates in coaxial cable 306. The traces 311A and 311B are on opposites sides of the dielectric board 305 more for convenience in achieving a 50 ohm transmission line impedance with reasonable dimensions of the line widths. An alternative coplanar waveguide arrangement, with 311A and 311B on the same side of board 305 is possible; it requires good control of a small gap between those elements to achieve the desired transmission line. The preferred method does require that the board 305 have a controlled dielectric constant and be low loss. The dipoles and traces can be formed on the epoxy board using any metal deposition or etch technique. Although not shown, the epoxy board may be contained in a cover to improve the aesthetic appearance of the antenna and to protect the antenna elements from damage. This cover should be made of a material having a low dielectric loss tangent for transmitted and received signals, and preferably be thin to minimize what signal loss there is in the cover.

Figure 4:
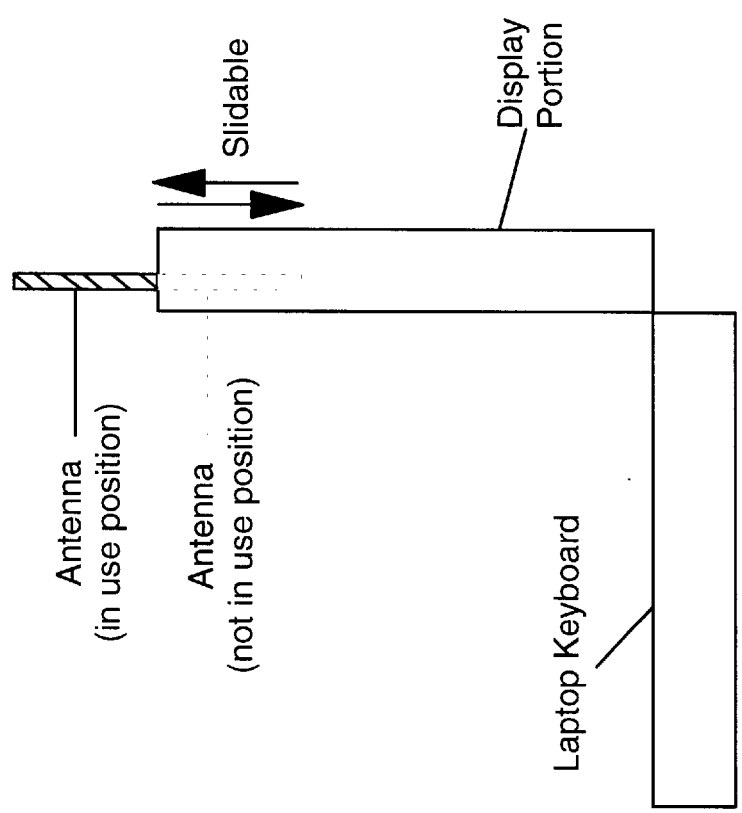
FIG. 4 depicts a profile view of a mobile computer with external antenna that is slidable deployable.

FIG. 4 depicts a profile look at a mobile computer with the an antenna card that is slidable mounted in the display portion of the mobile computer. The antenna card is storable in a recess in the display portion of the mobile computer when not in use or when not needed. The sliding mechanism permits the antenna to be secured in a stored or stow-a-way position. Note that the recess in the display portion permits a portion of the length of the coaxial cable (i.e., a loop) to be stored in the recess with the antenna. This length of cable enables the antenna card to be deployed in the fully deployed position while minimizing the storage area required by the portion of cable when the antenna card is in the stow-a-way position. A loop of coaxial cable may be employed for this purposes. The antenna card can be secured by using springs or a grasping mechanism suitably located in the recess. Also associated with the recess in the display portion may be a release mechanism that allows the antenna card to slide to the fully deployed position from the secured stow-away position. Likewise a release mechanism or the same release mechanism may be utilized to enable sliding of the antenna card from the fully deployed position to the stow-a-way position. The antenna card may contain a tab that extends slightly from the recess when the card is in the stow-a-way position that enables a mobile user to pull the card to the fully deployed position. The release mechanism may require a force greater than that required to slide the antenna card after release, to be applied to release the card from its secure position or to insert the antenna card into its secure positions. Also in the recess is a via that a coaxial cable can pass through that electrically couples the wireless adapter to the antenna. The via may secure the coaxial cable so that only the required length of cable is present in the recess.

FIG. 6 shows a cross-section for a sliding mechanism, with the cross-section across the direction of sliding. FIG. 6A depicts the cross section at the top of the case while FIG. 6B depicts the cross section at the recess opening within the case where the recess widens. See FIG. 7A for cross-section locations. The mobile computer casing 601 which might be the back of the display portion of a laptop computer, contains a recess (including room for the loop of cable) having a narrow opening towards the top of the case and a wider opening away from the top. FIG. 6A shows the width of the opening at the top of the casing 601 while FIG. 6B shows the wider recess opening within the casing to accommodate the cabling and the wider portion of the antenna card 603.

As shown in FIG. 7A the antenna card 603 has a narrow portion and a wide portion. The wide portion acts in conjunction with the wider portion of the recess to contain the antenna card in the recess. The wide portion may rest at the bottom of the recess when the antenna card is in the stowed position or be optionally secured by retainer clip 707 when the antenna card is in the stowed position. The wide portion of the antenna card is used as a stop where the recess narrows to prevent the antenna card from being removed from the recess. Retainer clip 707B secures the antenna card in the deployed position. The narrow portion of the antenna card extends across the narrower recess opening as shown in FIG. 6A. The casing or recess may be equipped with a cover plate or door that hides the antenna card from view when in the stored position. A cover or door gives the mobile computer a slimline appearance. If the upper portion of the antenna card is also provided with a cover having material that matches the color of the casing a sleek, slimline appearance is achieved when the antenna is deployed.

Figure 7B:
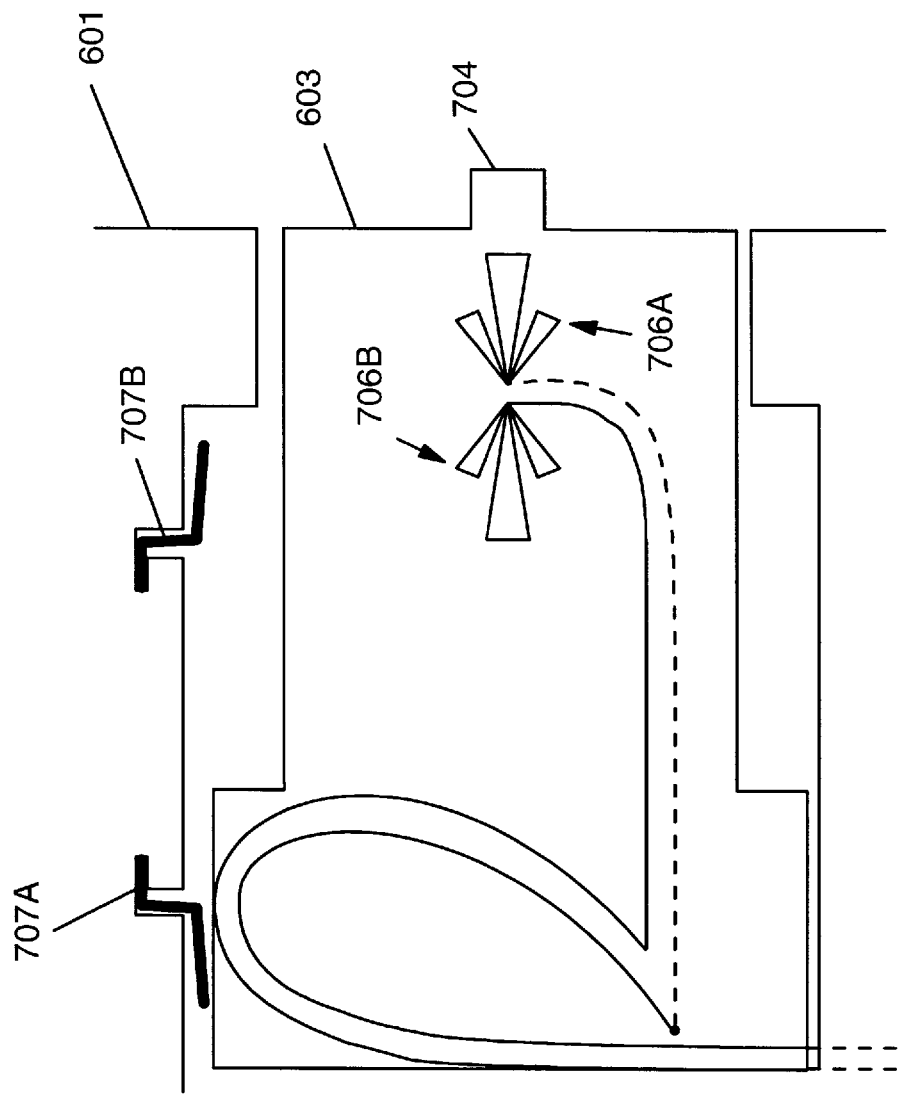
FIG. 7B depicts a side view of a sliding mechanism with antenna card in the stored position within a mobile computer.

In FIG. 7A, the antenna card 603 is shown in deployed position. The extended width portion of the antenna cooperates with the wider portion of the recess to form a constrained track in which the antenna card can slide. Coaxial cable 705 attaches on the back of the card to permit its capture within the recess of 701. As shown in FIG. 7A, spring 707B secures the card in the recess in the deployed position. FIG. 7B depicts the antenna card 603 in the stowed away position. Note the coaxial cable stores as a loop. This is also shown in FIG. 6. The card is secured by spring 707A in the stowed position. Tab 704 is for convenience in sliding the antenna card. If a cover is utilized the user would lift the cover and pull the tab 704 to deploy the antenna.

FIG. 8 shows the simple, flexible plastic spring, 707A and 707B, and the shape of openings in 801A and 801B in walls of the recess to hold the springs. The flexible plastic springs 707A and 707B serve to retain the antenna card in either the stored or deployed position. Several springs might be used to secure the antenna in each position. The spring 707A and 707B can be held in place by any securing means.

Figure 5:
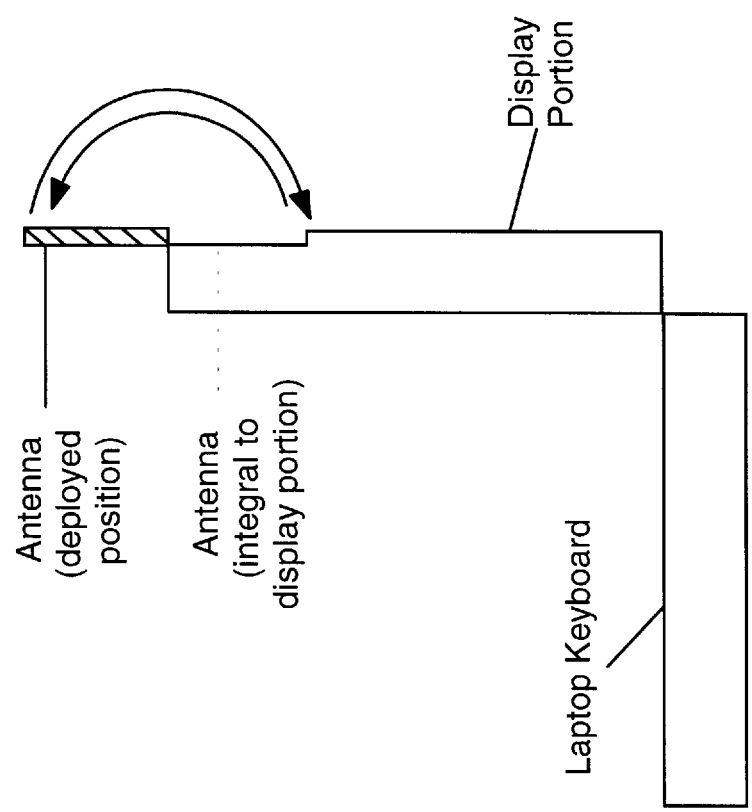
FIG. 5 depicts a profile view of a mobile computer with external antenna that is hingeably deployable.

FIG. 5 depicts an alternative embodiment where the antenna card is hinged to the back of the display portion. The hinging mechanism permits the antenna card to be easily deployed in the fully deployed position. When in the stowed-a-way position the antenna card forms a portion of the back of the display portion. A securing mechanism may be used to secure the antenna in the full up deployed position as well as in the stowed away position. The coaxial cable can be secured along the inner side of the opening without the need of a loop.

FIGS. 9A and B depict a more detailed embodiment of the folding embodiment of the present invention. In FIG. 9, casing 901 of the mobile computer which may be that of the back of the display of a laptop computer, is shown having a cutout portion 902 for storing the antenna 904 when the antenna is not in use. As shown in FIG. 9A, in the stored position the antenna 904 is secured by clip 903 made of deformable plastic. Clip 903 can be pulled out and down to release antenna 904 from the secured stored position. Pin 905 retains the antenna card 904 with the casing 901. In FIG. 10, depicts a profile view of the mobile computer, with pin 905 running through integral tab like members or bases 1006A, 1006B and 1006C on the antenna card 904 and bosses 1007A and 1007B on the casing 901. The bosses and bases have a recess (i.e., a hole or a slot) for receiving the pin 905 and for creating a form fit with each other. The fit is a force fit in a plastic such as nylon or Teflon, thereby allowing the card 904 to be held in any position to which it is set to by friction.

Figure 12:
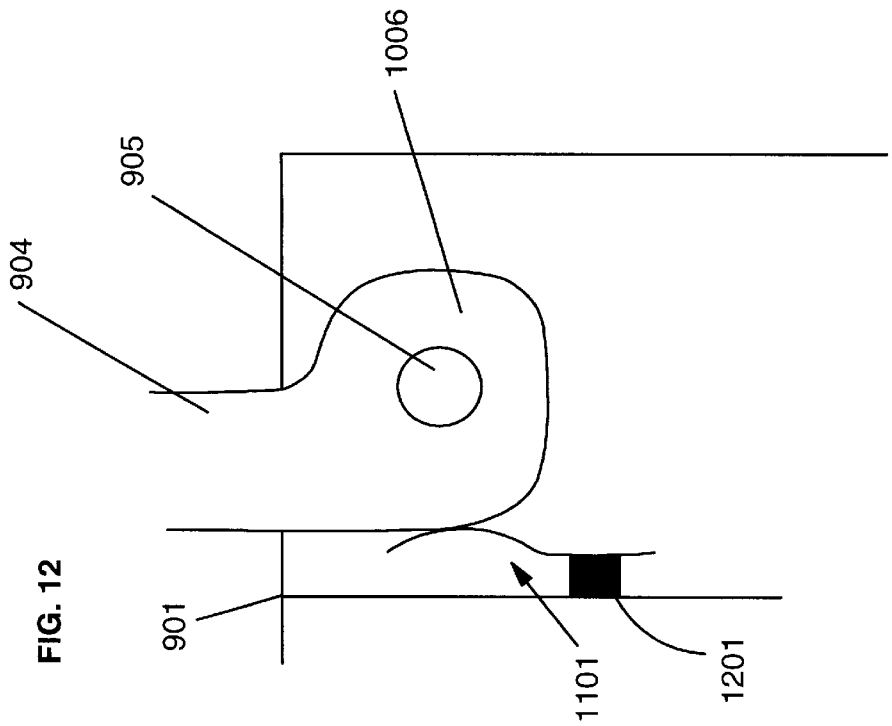
FIG. 12 depicts a more detailed view of the electrical coupling for the folding mechanism.
Figure 11:
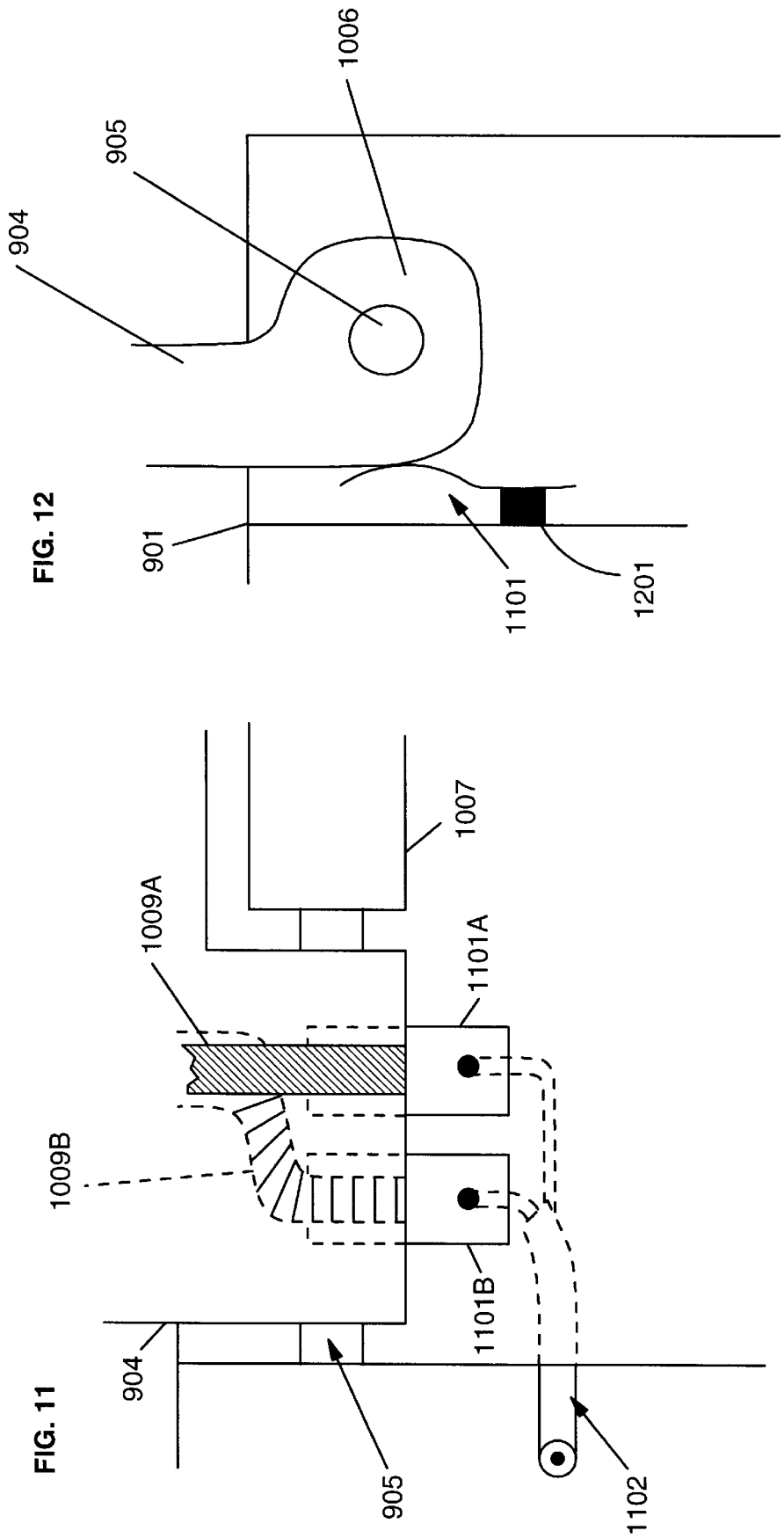
FIG. 11 depicts a more detailed view of the electrical coupling for the folding mechanism.

The connection of the coaxial cable to the antenna card can be via phosphor bronze sliding contacts to the metal traces on the antenna card. FIG. 11 depicts a more detailed look at the connection of the coaxial cable to the connector 1101 mounted in the cutout. The connector has two electrical contacts 101A and 101B. The coaxial shielding or ground is connected to one contact while the center conductor is connected to the other. The connector 1101 is secured to a wall of the cutout by mounting means 1201 which can be any means for securing the connector to the wall. The coaxial cable is connected to the connector 1101 and the 50 Ohm transmission line is electrically connected to the connector 1101 as shown in FIG. 11 and FIG. 12. Each trace line 1009A and 1009B is electrically coupled to 1101A or 1101B, respectively, by the sliding contact which provides electrical coupling to the coaxial cable and eventually the RF transceiver. Although, the antenna may be electrically coupled to the coaxial cable through the full range of motion of the antenna card about the hinge, it may be that electrical coupling is only provided when the antenna is near or at the deployed position.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed:

1. An radio antenna comprising:
    a dielectric card;
    a first pair of antenna traces forming a first dipole on the dielectric card for resonating at a first RF band;
    a second pair of antenna traces forming a second dipole on the dielectric card for resonating at a second RF band;
    a third pair of antenna traces forming a third dipole on the dielectric card for resonating at a third RF band;
    a first metal trace on the top of the dielectric card electrically coupled to one trace from each of said antenna pairs at a first common point;
    a second metal trace on the bottom of the dielectric card electrically coupled to one trace from each of said antenna pairs at a second common point;
    where said first and second traces form a single transmission line for the first, second and third dipoles.

2. The radio antenna of claim 1 further including a cover to protect the antenna from damage.

3. The radio antenna of claim 1 wherein the dielectric card is made of epoxy glass.

4. The radio antenna of claim 3 wherein the first RF band is 1850 MHZ to 1960 MHZ.

5. The radio antenna of claim 4 wherein the second RF band is 824 MHZ to 896 MHZ.

6. The radio antenna of claim 5 wherein the third RF band is 2400 MHZ to 2500 MHZ.

7. The radio antenna of claim 1 wherein the first RF band is 1850 MHZ to 1960 MHZ.

8. The radio antenna of claim 7 wherein the second RF band is 824 MHZ to 896 MHZ.

9. The radio antenna of claim 8 wherein the third RF band is 2400 MHZ to 2500 MHZ.

10. A mobile computer comprising:
    a system unit;
    an antenna having a dielectric card with a first pair of antenna traces forming a first dipole on the dielectric card for resonating at a first RF band, a second pair of antenna traces forming a second dipole on the dielectric card for resonating at a second RF band, a third pair of antenna traces forming a third dipole on the dielectric card for resonating at a third RF band, a first metal trace on the top of the dielectric card electrically coupled to one trace from each of said antenna pairs at a first common point, a second metal trace on the bottom of the dielectric card electrically coupled to one trace from each of said antenna pairs at a second common point, said first and second traces forming a single transmission line for the first, second and third dipoles;
    a display portion coupled to the system unit, said display portion forming a recess, said recess providing a receptacle for securing the antenna; and
    a sliding mechanism for securing said antenna within the recess in a stowed away position and for securing the antenna in a fully deployed position, said sliding mechanism permitting said antenna card to slide between said secured positions when released.

11. The mobile computer of claim 10 wherein the antenna having a cover.

12. The mobile computer of claim 10 further comprising a coaxial cable which is electrically coupled to the antenna and a coaxial connector located on an outside surface of the mobile computer.

13. The mobile computer of claim 12 wherein the outward surface is the bottom of the display portion.

14. The mobile computer of claim 10 wherein the dielectric card is made of epoxy glass.

15. The mobile computer of claim 10 wherein the first RF band is 1850 MHZ to 1960 MHZ.

16. The mobile computer of claim 15 wherein the second RF band is 824 MHZ to 896 MHZ.

17. The mobile computer of claim 16 wherein the third RF band is 2400 MHZ to 2500 MHZ.

18. A mobile computer comprising:

a system unit;

an antenna having a dielectric card with a first pair of antenna traces forming a first dipole on the dielectric card for resonating at a first RF band, a second pair of antenna traces forming a second dipole on the dielectric card for resonating at a second RF band, a third pair of antenna traces forming a third dipole on the dielectric card for resonating at a third RF band, a first metal trace on the top of the dielectric card electrically coupled to one trace from each of said antenna pairs at a first common point, a second metal trace on the bottom of the dielectric card electrically coupled to one trace from each of said antenna pairs at a second common point, said first and second traces forming a single transmission line for the first, second and third dipoles;

a display portion coupled to the system unit, said display portion forming a recess, said recess providing a receptacle for securing the antenna; and a hinging mechanism for securing said antenna within the recess in a stowed away position and for securing the antenna in a fully deployed position, said hinging mechanism permitting said antenna card to travel between said fully deployed and stored positions.

19. The mobile computer of claim 18 wherein the antenna is contain within a cover.

20. The mobile computer of claim 18 further comprising a coaxial cable which is electrically coupled to the antenna and a coaxial connector located on an outside surface of the mobile computer.

21. The mobile computer of claim 20 wherein the outward surface is the bottom of the display portion.

22. The mobile computer of claim 18 wherein the dielectric card is made of epoxy glass.

23. The mobile computer of claim 18 wherein the first RF band is 1850 MHZ to 1960 MHZ.

24. The mobile computer of claim 23 wherein the second RF band is 824 MHZ to 896 MHZ.

25. The mobile computer of claim 24 wherein the third RF band is 2400 MHZ to 2500 MHZ.

* * * * *